United States Patent [19]

Doll et al.

[11] 4,239,620
[45] Dec. 16, 1980

[54] CYANIDE REMOVAL FROM WASTEWATERS

[75] Inventors: Brian E. Doll, Westmont, N.J.; Vernon F. Coty, West Chester, Pa.; Philip P. Lifland, Woodbury, N.J.

[73] Assignee: Mobil Oil Corporation, New York, N.Y.

[21] Appl. No.: 30,418

[22] Filed: Apr. 16, 1979

[51] Int. Cl.³ .............................. C02F 1/28; C02F 3/00
[52] U.S. Cl. .................................... 210/601; 210/684; 210/904
[58] Field of Search ................. 210/DIG. 31, 5, 7, 11, 210/18, 24, 27, 28, 29, 37 B, 59

[56] References Cited

U.S. PATENT DOCUMENTS 3,756,947  9/1973  Fujii et al. .................. 210/DIG. 31

FOREIGN PATENT DOCUMENTS 48-21667  3/1973  Japan .............................. 210/DIG. 31
50-80657  6/1975  Japan .............................. 210/DIG. 31

Primary Examiner—Thomas G. Wyse
Attorney, Agent, or Firm—C. A. Huggett; R. J. Cier

[57] ABSTRACT

Removal of cyanide in wastewater treatment improved by initially contacting a rich cyanide bearing stream with activated sludge at a pH within the range of 3-6 upstream of the wastewater treating plant.

5 Claims, 2 Drawing Figures

CYANIDE REMOVAL FROM WASTEWATERS

BACKGROUND OF THE INVENTION

Regulatory limits on cyanide in wastewater effluents are becoming more stringent by government regulations and in some states the limits have reached 0.1 mg/l total cyanide.

There are many industrial sources of aqueous cyanide wastes such as from electroplating, steel and coke operations and the manufacture of chemicals. Many naturally occurring hydrocarbon oils such as petroleum, shale oil, tar sand oils and their fractions contain nitrogen compounds which react under selected conditions with metals such as iron and carbon to form metal cyanide complex compounds. Reaction conditions which favor formation of such metal cyanides include a temperature of 700° F. and higher in a reducing atmosphere. These formed cyanides are slightly soluble in water and are found in various foul water streams of a refinery operation in admixture with other undesirable reaction products such as phenol and hydrogen sulfide. Metal cyanide complex compounds are formed in the cracking operations such as fluid catalytic cracking, coking, and hydrocracking operations of a refinery operation, and such formed cyanides end up in some considerable measure in the sour water product stream of the refinery operation.

The subject of water treatment and particularly wastewater of the chemical and petroleum refining industry has been investigated by many researchers in the field. For example, an article entitled "Selective Removal of Cyanide from Industrial Waste Effluents with Ion-Exchange Resins" by N. L. Avery and W. Fries was published in Ind. Eng. Chem. Prod. Res. Dev., Vol. 14, No. 2, 1975. Another pertinent review article on the refinery cyanide problem is entitled "Refinery Cyanides: A Regulatory Dilemma" by R. G. Kung, J. P. Casey and J. E. Huff, published in Hydrocarbon Processing, October 1978. A prior art patent of particular interest on the subject is that of U.S. Pat. No. 3,990,971 issued Nov. 9, 1976.

Up to the present disclosure, there has been no low cost effective process for the disposal of cyanides in refinery wastewaters. The method and process of this invention provide a solution to this dilemma.

SUMMARY OF THE INVENTION

The present invention is concerned with and involves the concept of contacting activated sludge with a high or concentrated cyanide bearing wastewater stream, such as the sour water stripper bottoms comprising from (1 to 10 mg/l of cyanides) at a low pH within the range of 3–6 upstream of the wastewater treating plant. It has been found in the investigation leading to the concepts of this invention that the complex cyanides are strongly adsorbed by the wastewater sludge when maintained acidic and at a low pH in the range of 3–6. This sludge, known as activated sludge because of microorganisms therein, is then separated from the wastewater by clarification and/or filtration and any sludge which is not so eliminated in this step can be separated from the wastewater downstream in primary treating units of the wastewater treatment plant.

The processing concept of the present invention differs significantly from that of the more costly cyanide removal by ion exchange resins discussed in the above identified article. That is, this invention concept requires no pretreatment of the cyanide bearing wastewater other than a pH adjustment before contacting with activated sludge obtained as hereinafter described. In water treating facilities employed by many in the industry, the activated sludge is a waste by-product of biological oxidation in the wastewater treatment plant and therefore is readily available as a disposable material and thus considered free of cost. No regeneration of the sludge is necessary, since it can be used as recovered on a once-through basis. The sludge thus used to adsorb cyanide compounds is disposed of by land application or preferably charged to a coking operation during the quench cycle. The concept differs from the more conventional known activated-sludge process in that the sludge is used merely as an adsorbent, not as a biologically active agent for oxidation of wastes, and thus no oxygen is required in the process.

The concepts of the invention resulted from a pH study of cyanide adsorption-desorption phenomenon with activated sludge. It was found and demonstrated that cyanides build up relatively slowly on activated sludge at the normally maintained pH condition in the range of 7–8 in wastewater treating operations. It was established, however, that a low pH greatly enhanced adsorption of cyanides into activated sludge with and without active microorganisms. The fact that sludge over and above that recycled in the normal operation of the wastewater treater must be disposed of contributes to the low cost or free sludge required in the present invention.

The findings contributing to the concepts of the present invention take on significantly greater meaning when it is recognized that eliminating cyanides from the wastewater in an upstream portion of the wastewater treatment plant substantially lessens, if not completely reduces, the build-up of cyanides on the sludge and subsequent sudden release in the downstream aeration basins due primarily to change to higher pH.

DISCUSSION OF SPECIFIC EMBODIMENTS

Figure 1:
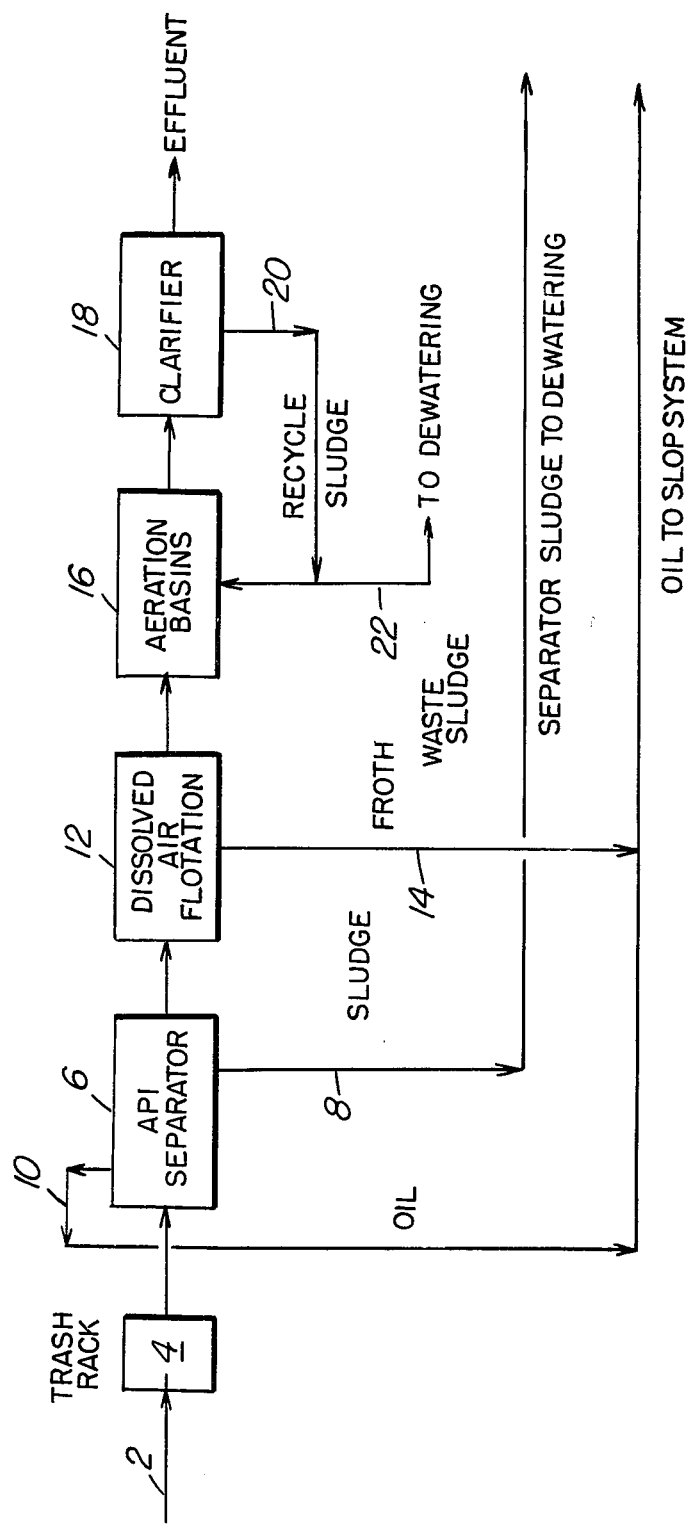
FIG. 1 is a diagrammatic block flow arrangement showing a typical wastewater treatment facility used in a petroleum refining operation.

Referring now to FIG. 1 by way of example, the wastewater treating system typically employed provides facilities for treating the refinery process wastewater stream. The treatment consists of primary treatment for oil and suspended solids removal, and biological treatment for dissolved material removal. Facilities for oil and sludge handling are also provided.

The refinery process wastewater stream 2 is composed of water from almost every unit in the refinery. It may also include cooling tower blowdown, stormwater, treated sour water, ballast water, recycled service water, and process water diversions from one or more settling ponds and ditch projects.

Wastewater from a typical refinery process sewer system flows by conduit 2 to a trash rack 4. The trash rack removes large solid objects from the wastewater. The wastewater flows generally by gravity from trash rack 4 to an API separator 6. The API separator removes oil and suspended solids by gravity. Solids settle to the bottom of the separator, while oil is skimmed off the top. The sludge is removed from the bottom of the separator by conduit 8 for processing before disposal in, for example, a coker vessel not shown. Oil recovered from the separator is passed by conduit 10 to a slop oil tank not shown and then to the slop system for disposal. Water from the API separator is passed to a dissolved air flotation (DAF) unit 12. The DAF removes some of the suspended solids and oil which were not removed by the API separator. This now provides a wastewater feed passed to the Biological Treatment Plant discussed below. The DAF removes oil and solids by floating them out of the wastewater with air bubbles. A portion of the DAF effluent is saturated with air by means not shown and recycled to the inlet of the unit where the air comes out of solution as tiny bubbles. These bubbles attach themselves to the suspended solids and oil, causing them to float to the surface where they are skimmed off as froth. The froth is removed by conduit 14 and processed for oil recovery.

The effluent of DAF unit 12 flows to the biological treatment plant.

The biological treatment plant uses a completely mixed activated-sludge process to remove contaminants from the wastewater. The wastewater flows to aeration basins 16 where it is mixed with flocculated biological growths, and oxygen from the air is stirred into the mixture by aerators. The basins are large and provide time for the organic matter in the waste to be consumed by the microorganisms. This produces energy, bio-oxidation by-products such as $CO_2$ and water, and new organisms. The mixed liquor, which is the term for the mixture of the wastewater and biological growths, then flows to clarifiers 18. The biological solids are separated from the wastewater in the clarifiers. Most of the solids settle to the bottom as sludge and are removed by conduit 20. The solids or sludge is recycled to the aeration basins where it is mixed with the incoming wastewater. Because the sludge in the aeration basins is constantly growing, a portion must be removed to maintain the desired sludge concentration.

Sludge is "wasted" by removing an excess portion of the recycle sludge by conduit 22. The waste sludge is dewatered before disposal in, for example, a delayed coker.

Treated water obtained as above identified overflows clarifier weirs in clarifier 18 and may be further treated or discharged as the final effluent of the wastewater treating system.

Figure 2:
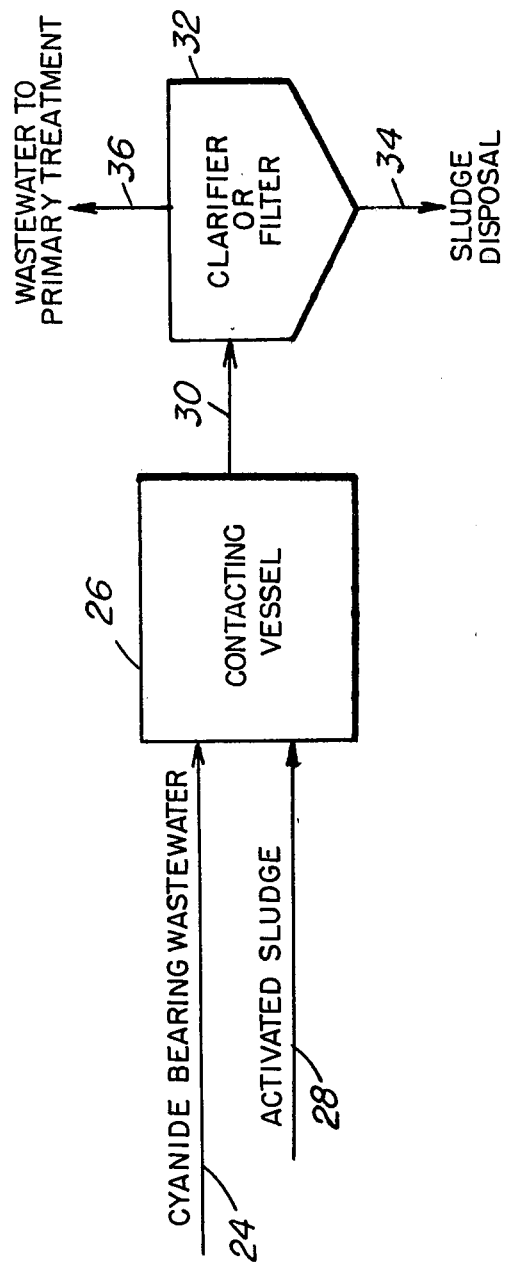
FIG. 2 is a diagrammatic sketch of the process concepts of the invention, intended for use upstream of the water treating process of FIG. 1.

The invention concept of using the sludge adsorption phenomenon as a refinery processing add-on to remove cyanides upstream of the wastewater treatment plant above briefly described is particularly represented briefly in block flow arrangement in FIG. 2. In the arrangement of FIG. 2, a cyanide bearing wastewater such as sour water stripper bottoms of a petroleum refining operation is charged by conduit 24 to a mixing vessel 26. A portion of the excess activated sludge, either before or after dewatering and recovered from the process arrangement of FIG. 1, is charged by conduit 28 to vessel 26. As mentioned above, the activated sludge in conduit 28 is excess material normally disposed of in the process arrangement of FIG. 1 as by conduit 22 and may comprise a mixture of alive and dead microorganisms. In contacting vessel 26, a mixture of sour water and activated sludge is thoroughly achieved and is pH adjusted to within the range of about 3-6 by the addition of acidic material suitable for the purpose. In this operation, it was found that, in a sour water stripper bottoms comprising 4.37 mg/l cyanide, the cyanide concentration was reduced 77% by a 1:50 mixture of sludge to wastewater at pH 4.5. This compares with an 18% reduction by the same proportion of sludge at pH 7.42. The sludge used contained 9516 mg/l solids, which is a typical concentration of recycled sludge in the operation of FIG. 1. This obtained very large and unexpected adsorption capacity of the sludge at the low pH 3-6 insures that the quantity of wasted (free) activated sludge in conduit 22, for example, and produced at a typical wastewater treatment facility, is more than adequate to adsorb most experienced cyanides in the sour water stripper bottoms stream of petroleum refining.

The sour water treated as above described in vessel 26 admixed with sludge is then passed by conduit 30 to a clarifier or filter means 32 wherein a separation is made to recover sludge with adsorbed cyanides withdrawn by conduit 34 from water substantially depleted of cyanides recovered by conduit 36. The water in conduit 36 is then passed through wastewater treatment facilities similar to FIG. 1 discussed above or a portion thereof to or downstream of API separator 6 or DAF zone 12. The sludge concentrate with adsorbed cyanides in conduit 34 is preferably disposed of in a delayed coking vessel where the cyanide complex is adsorbed on the coke and oxidized to more acceptable materials when the coke is ultimately burned.

Having thus generally described the method and concepts of the invention and discussed specific embodiments in support thereof, it is to be understood that no undue restrictions are to be imposed by reasons thereof except as defined by the following claims.

We claim:

1. In a refinery wastewater treating facility to remove entrained oil, suspended solids, complex cyanides and effect biological treatment of the waters before discharge, the improvement which comprises, recovering activated sludge from the biological treatment step of the wastewater treating operation, contacting recovered activated sludge with wastewater enriched with complex cyanides and substantially removing the complex cyanides by maintaining the pH during said contact within the range of 3-6, and recovering wastewater substantially reduced in complex cyanides for further treatment in said refinery wastewater treating facility.

2. A method for improving the removal of complex metal cyanides from industrial wastewater which comprises, contacting at a pH within the range of 3-6 a water stream comprising complex metal cyanides with sufficient biological sludge obtained from a wastewater treating facility to remove a major portion of said complex cyanides from said wastewater and thereafter passing the wastewater of reduced complex cyanides through said wastewater treating facility, including biological treatment thereof.

3. The method of claim 2 wherein the wastewater with complex cyanides comprises the sour water product stream of a petroleum refining operation.

4. The method of claim 2 wherein the water stream comprising complex cyanides is obtained from one or more industrial sources such as electroplating, chemical manufacture, steel and coke producing operations.

5. The method of claim 2 wherein the biological treatment of wastewater produces an excess of activated sludge over that recycled in the operation and the excess sludge is used to initially remove a major portion of the complex cyanides from the wastewater before processing through the wastewater treating facility.

* * * * *